United States Patent [19]

DiTommaso et al.

[11] Patent Number: 4,568,044

[45] Date of Patent: Feb. 4, 1986

[54] WING HOUSING AND COVER RELEASE ASSEMBLY FOR SELF-ERECTING WING

[75] Inventors: Anthony DiTommaso, Upland; Ronald T. Inglis, Laguna Beach; Richard C. Worley, Pomona, all of Calif.

[73] Assignee: General Dynamics, Pomona Division, Pomona, Calif.

[21] Appl. No.: 512,646

[22] Filed: Aug. 12, 1983

Related U.S. Application Data

[63] Continuation of Ser. No. 347,660, Feb. 10, 1982, abandoned.

[51] Int. Cl.[4] .......................... B64C 3/56; F42B 13/32

[52] U.S. Cl. ...................................... 244/49; 244/3.27

[58] Field of Search .................... 244/3.24, 3.25, 3.26, 244/3.27, 3.28, 3.29, 46, 49, 91, 218; 292/144, 157, 160, 161; 220/315, 324, 326; 16/254, 267

[56] References Cited

U.S. PATENT DOCUMENTS

| | | | |
|---|---|---|---|
| 1,578,408 | 3/1926 | Diday | 16/267 |
| 1,892,949 | 1/1933 | Holmes | 244/6 |
| 3,478,919 | 11/1969 | Turpen | 292/160 |
| 4,351,499 | 9/1982 | Maudal et al. | 244/3.27 |

*Primary Examiner*—Trygve M. Blix

*Assistant Examiner*—Rodney Corl

*Attorney, Agent, or Firm*—Neil F. Martin; Edward B. Johnson

[57] ABSTRACT

A self-erecting collapsible wing for an airframe includes a telescoping strut assembly including a leading strut and a trailing strut each pivoted at an inner end to fixed pins on a base support structure of a wing housing within a slot in the airframe for retraction to a colinear position within the housing and spring biased to an outward fully deployed position. A releasable cover conforming to the curvature of the airframe is normally latched in position over the slot when the wing is in the collapsed position within the wing housing and is jettisoned to permit automatic self-erection of the wing.

11 Claims, 10 Drawing Figures

WING HOUSING AND COVER RELEASE ASSEMBLY FOR SELF-ERECTING WING

This is a continuation of application Ser. No. 347,660 filed Feb. 10,1982, now abandoned.

BACKGROUND OF THE INVENTION

The present invention relates to rockets and missiles and pertains particularly to collapsible wing structures for such missiles.

Many rockets and missiles utilize some form of wing or stabilizer structure for stabilizing the missile during flight. Missiles are frequently stored and launched from tubular launchers and are frequently deployed from aircraft or other missiles. Under such circumstances it is frequently necessary to minimize the space for the missile until it is launched. Folding wings of various types and configurations have been utilized in the past to minimize the space required for such missiles.

The premium for space requires that the folding or collapsing wing structures be foldable or collapsible to a minimum space. In addition, the flight characteristics of the missile require optimum reliability and performance of the deployed wing structure. It is therefore desirable that the folding wing structure have highly efficient flight characteristics and, at the same time, be foldable to a minimum space.

A cavity or wing housing must be provided within the airframe structure for containing the folded wing and open to the exterior of the airframe to permit extension of the wing. A reliable closure must be provided for the opening that functions to eliminate excessive drag, to effectively contain the wing structure and to permit extension of the wing without interference.

SUMMARY AND OBJECTS OF THE INVENTION

It is therefore the primary object of the present invention to provide an improved wing support structure for collapsible wings.

In accordance with the primary aspect of the present invention, a telescopic wing support structure for a collapsible and extensible wing structure includes inner and outer telescoping strut members including a leading strut and a trailing strut, being telescopically compressed to a colinear position within a compact housing mounted on an airframe and includes an opening through which the wings extend to the fully deployed extended position with a releasable cover than can be jettisoned to enable extension of the wings.

BRIEF DESCRIPTION OF THE DRAWINGS

The above and other objects and advantages of the present invention will become apparent from the following description when read in conjunction with the accompanying drawings wherein.

DETAILED DESCRIPTION OF A PREFERRED EMBODIMENT

Figure 1:
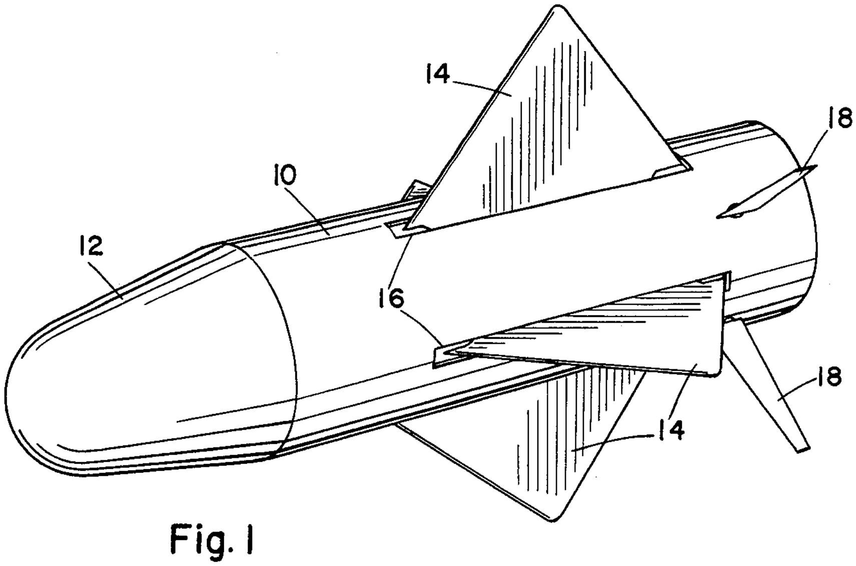
FIG. 1 is a perspective view of a typical missile incorporating the self-erecting wings.

Turning to the drawings, there is illustrated in FIG. 1 a missile having a generally cylindrical body 10 with a nose cone 12 and a plurality of radially outwardly extending wings 14 extending outwardly from a plurality of circumferentially arranged longitudinally extending slots 16 in the body 10. A plurality of guiding or steering fins or rudders 18 extend radially outward from the tail end of the missile body.

The missile can have any suitable form of guidance and propulsion systems and any required configuration of warhead. The missile can be launched in any suitable manner such as from ground vehicles or locations, aircraft, or other missiles. The space saving developments of the present invention, however, were primarily developed for utilization in missiles transported by other missiles wherein space and reliability is a premium.

The wings can have any suitable configuration with the illustrated embodiment having a generally triangular configuration. The wing fabric covering 66 is constructed of a flexible or pliable material such as a lightweight nylon or dacron and is cut and sewn in a way that it precisely conforms to the supporting strut assembly in its extended position.

The wing assembly is self-contained and is a completely operable modular unit that can be detachably mounted within the rocket body positioned for extension or retraction of the wing through a slot in the rocket body. The wing assembly includes a channel housing 20 having an elongated multiwidth slot 22 extending the length of the housing defining a chamber or cavity within which the wing folds. The housing 20 has an outer configuration or curvature conforming substantially to the shape of the surface of the missile and includes means that will be described, including a disposable cover 26 for covering the retracted wing opening. The housing body 20 includes a base plate 24 as can best be seen in FIGS. 7 through 9. The base plate 24 is detachable from the housing 20 and serves as the primary mounting structure for the wing struts. The plate 24 also serves to clamp the wing covering fabric between the base plate and housing.

Figure 7:
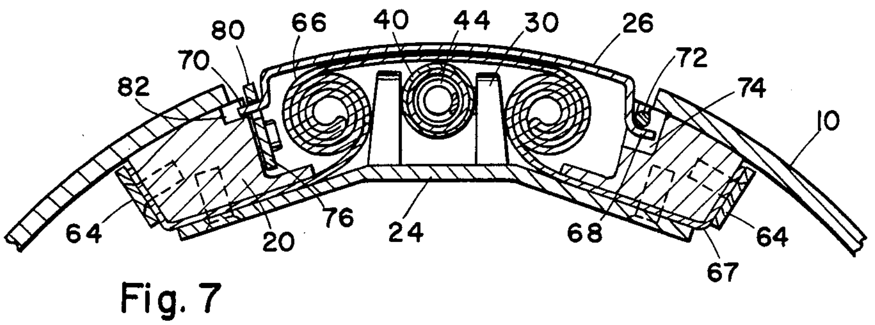
FIG. 7 is an enlarged sectional view taken on line 7—7 of FIG. 2.
Figure 8:
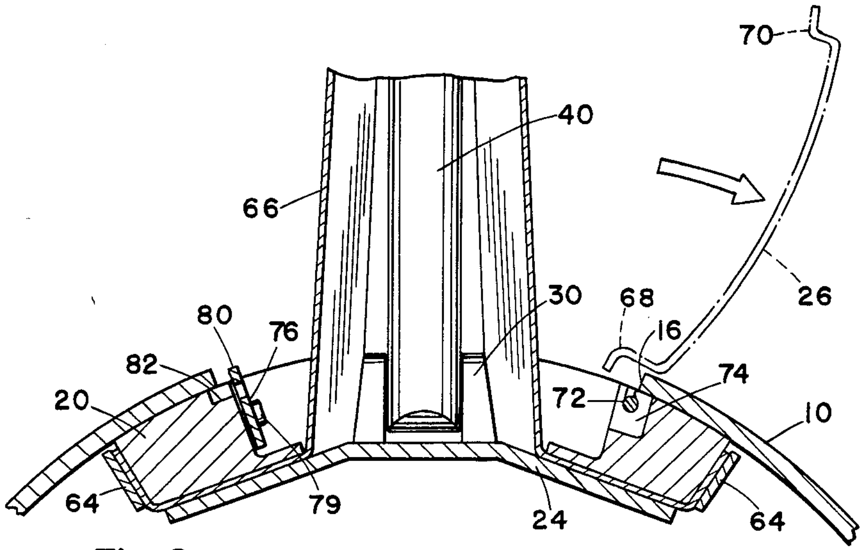
FIG. 8 is a view similar to FIG. 7, but with the cover released and the wing erected.
Figure 9:
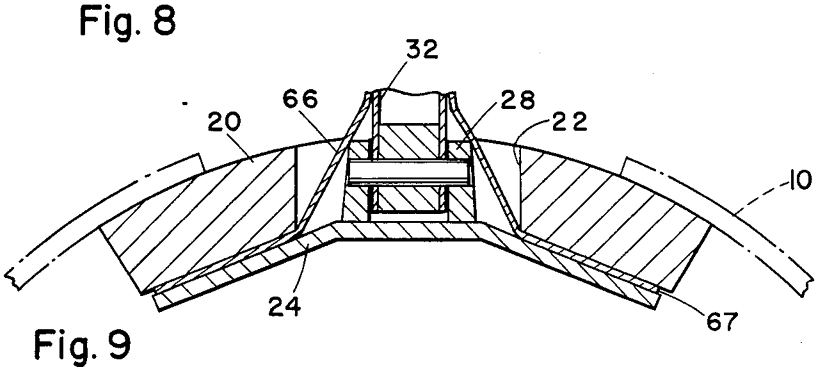
FIG. 9 is an enlarged sectional view taken on line 9—9 of FIG. 4.

The housing is of a depth and width to receive and enclose the collapsed wing strut assembly and the fabric covering thereof and includes a detachable cover 26 as shown in FIGS. 7 and 8 for covering the retracted wing pocket. The wing housing is mounted at an opening in the skin of the missile.

Figure 4:
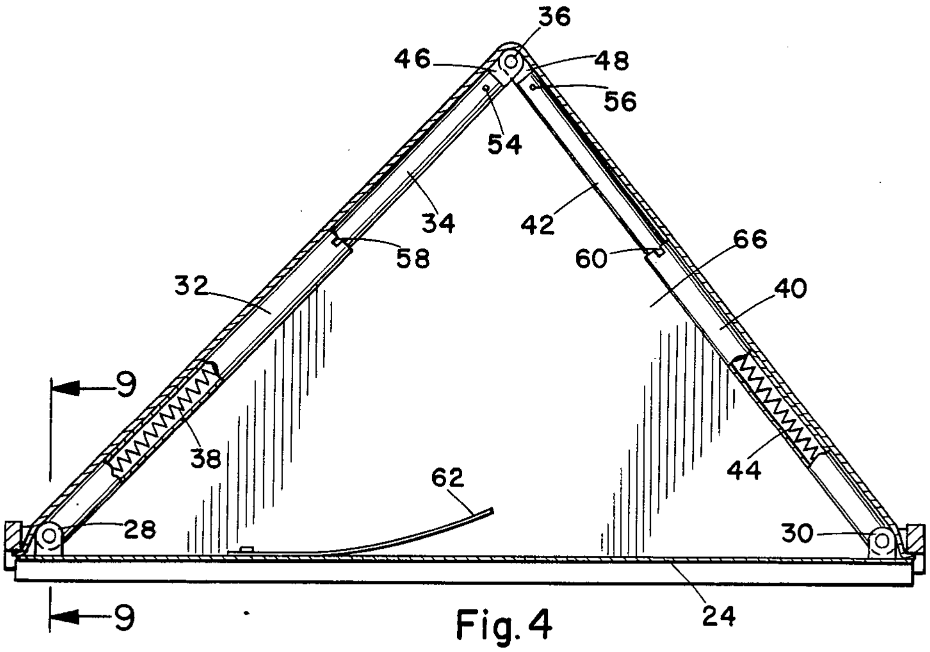
FIG. 4 is a sectional view taken on line 4—4 of FIG. 3.

The support strut assembly for the wing fabric is best seen in FIG. 4 and includes a forward strut assembly pivotally mounted or hinged on a forward hinge bracket 28 mounted to the forward end of the bottom plate 24 and a trailing strut pivotally mounted to a trailing hinge bracket 30 secured to the bottom plate 24. The forward strut includes a lower outer tubular strut member 32 pivotally mounted or hinged to the bracket 28 and telescopingly receiving an inner upper tubular strut member 34 which is pivotally secured by means of a hinge pin 36 at the outer end to the trailing strut. A compression spring 38 is mounted within the bore of both the lower and upper tubular members 32 and 34 and extends substantially the full length thereof. This spring is preferably under sufficient compression at its outermost position to retain the strut in its extended position under normal circumstances.

The trailing strut is substantially identical to the leading strut including a lower tubular strut member 40 hinged to the hinge bracket 30 and telescopingly receiving a tubular inner or upper tubular strut member 42. A compression spring 44 is confined within the bore of the tubular members and extends substantially the full length thereof and similarly is under sufficient compression at its outermost position for retaining the strut in its extended position.

The outer end of inner strut member 34 includes a bifurcated hinge bracket member 46 receiving a hinge member 48 of the inner strut member 42.

Each strut is provided with an extension or anticollapse lock (not shown) to prevent the wing loading from compressing the strut. These locks are formed as fingers by cutting a narrow U-shaped slot in the wall of the upper strut member. The finger bent outward with its free end pointing toward the open end of the upper strut 34 or 42 such that when biased outward it engages the outer end of the outer strut member 32 or 40.

Figure 6:
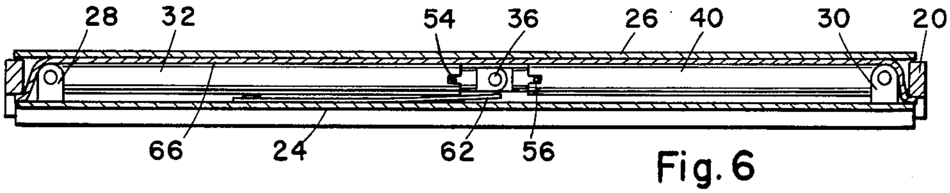
FIG. 6 is sectional view taken on line 6—6 of FIG. 2.

At least one of the struts is provided with an antirotation lock to prevent accidental rotation of the outer strut members when the struts are in a colinear or collapsed position. Turning to FIGS. 4 and 6, antirotation locks are provided and each respectively consists of pins 54 and 56 extending outward from the upper strut member at a position to engage slots 58 and and 60 at the outer end of the lower strut members 32 and 40 upon complete collapse of the strut assembly to the colinear position as shown in FIG. 6. Although two locks are illustrated, one for each strut, a single lock would appear to serve the purpose in most instances.

Turning now to FIG. 4, a leaf spring 62 is disposed or mounted on the base plate 24 disposed directly beneath the strut assembly for engaging and applying a force to the strut assembly below the hinge pin 36 upon folding of the struts to the collapsed position as shown in FIG. 6. Ths spring 62 provides an initial outward thrust or force on the struts preventing them from locking in the collapsed position.

The fabric cover 66 of the wing, as previously discussed, is shaped to encompass the strut structure and includes a base portion or skirt portion 67 that is secured to the wing housing 20 by clamping between the base plate 24 and the housing and including peripheral clamp plates 64 as can be seen in FIGS. 7 and 8. These ensure a secure attachment of the wing fabric to the wing housing.

The above described wing structure can be collapsed into a folded position and the fabric covering rolled within the wing housing as shown in FIG. 7. This is accomplished by compressing the strut locks and applying a force at the tip of the wing in a direction that telescopically compresses or collapses the two struts. The struts become progressively shorter and pivot about the lower hinge pins until they reach the fully folded or collapsed position where they are colinear and lying against the base plate 24 as shown in FIGS. 6 and 7. At this point, the compression springs 38 and 44 within the two struts are fully compressed to very near their solid heights at which position they deliver their maximum force. With the struts in this position, however, the spring force is in a direction colinear or coaxially thereof and does not tend to force the wings open. In order to initiate unfolding of the wings, it is necessary to bias or force the strut from this position. This is accomplished by means of the leaf spring 62 applying a force biasing the struts a small distance outward such that the compression springs within the struts act to quickly snap the wing outward to its fully extended position. The spring 62 is positioned and shaped, as shown in FIG. 4, such that when the struts are in a fully collapsed position as shown in FIG. 6 the spring is loaded to provide an initial force for extension of the struts and wing assembly.

Figure 2:
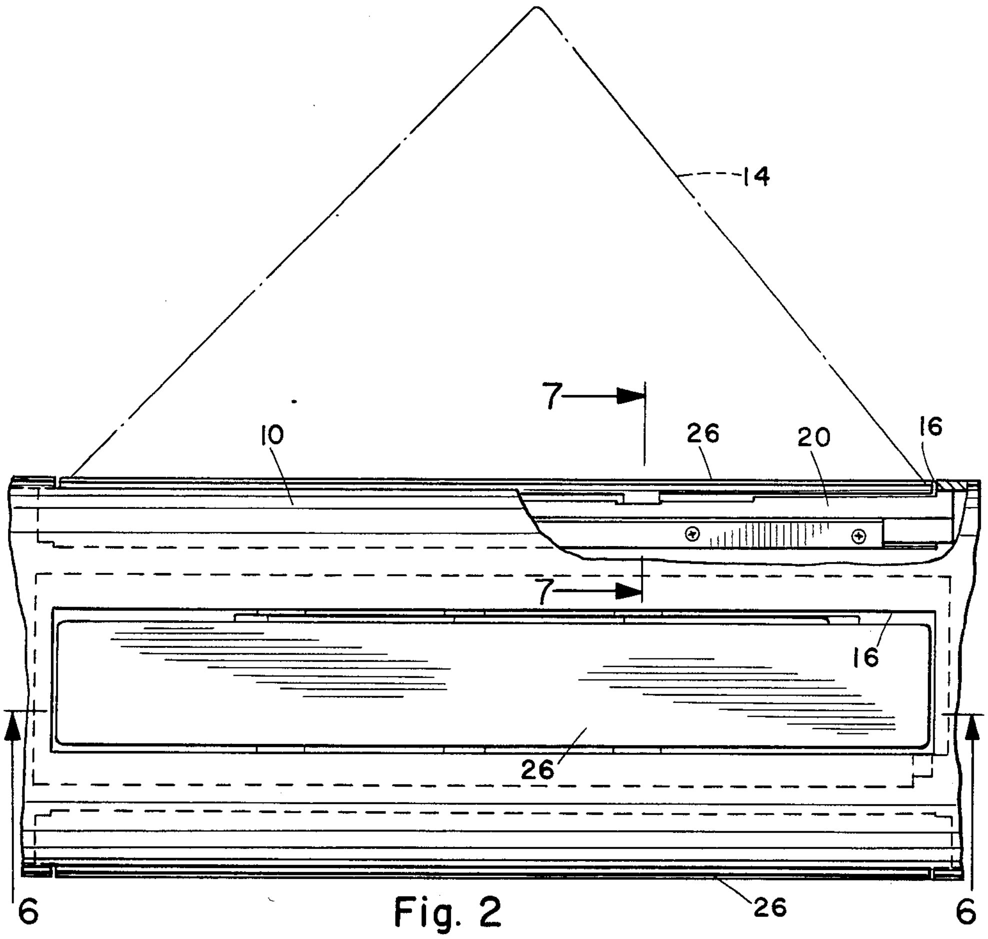
FIG. 2 is a side elevation view of the wing-containing section of the missile body, with the wings folded and enclosed.

A releasable cover extends over and covers the opening over the folded wing structure as best seen, for example, in FIGS. 2, 6 and 7. This wing cover 26 comprises an elongated generally rectangular plate covering the housing opening when the wing is folded therein. The wing cover 26 as best seen in FIGS. 7 and 8 includes a plurality of hinge tabs 68 on and extending along one side of the cover and a plurality of latch tabs 70 extending along the other side of the cover. The hinge tabs 68 fit under the hinge pins 72. The latch tabs 70 extend beneath and engage latch fingers 80 on the latch plate 76. The upper surface of the cover as seen in FIG. 7 is curved to conform generally to the configuration of the missile housing to provide minimum resistance to air flow and to eliminate space occupying protuberances.

Figure 3:
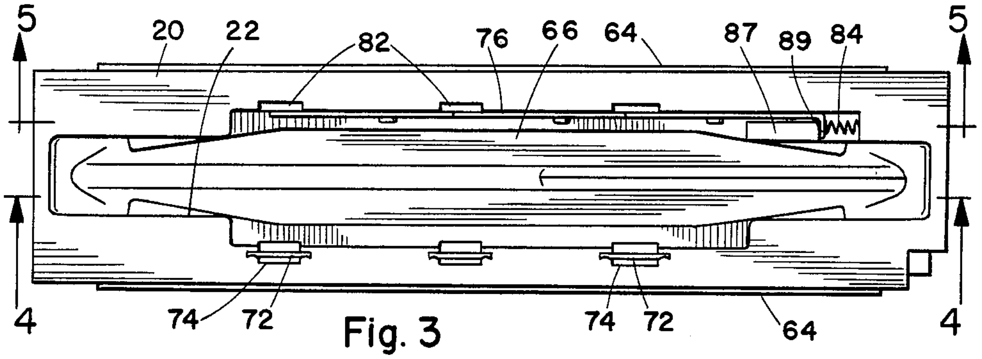
FIG. 3 is a top plan view of one wing unit in the erected position.
Figure 5:
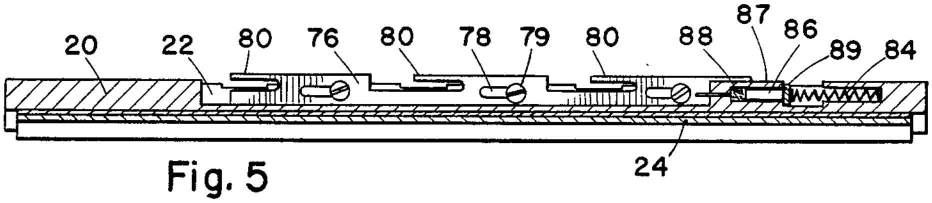
FIG. 5 is a sectional view taken on line 5—5 of FIG. 3.
Figure 10:
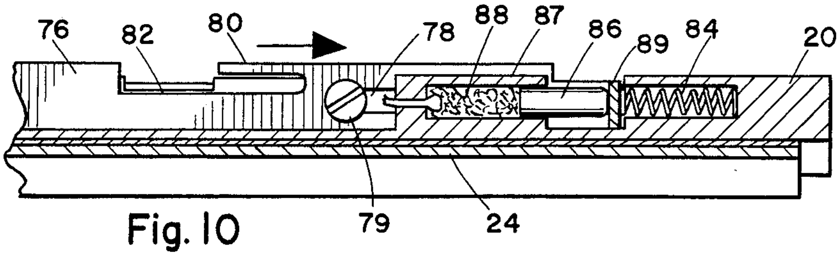
FIG. 10 is an enlarged view similar to a portion of FIG. 5, showing the cover latch in released position.

As best seen in FIG. 3, a plurality of hinge pins 72 are mounted in a plurality of slots or depressions 74 along one side of the wing housing and are engaged by the hinge tabs 68. A slideable latch plate 76 as shown in FIGS. 5 and 10 is secured by means of a plurality of slots 78 and shoulder screws 79 to the opposite side wall of the housing with a plurality of latch fingers 80 biased to a position (latched position) overlapping a plurality of tab receiving slots 82 in the sidewall of the housing. The latch plate is biased to the latched position with fingers 80 overlapping and engaging latch tabs 70 by means of a compression spring 84 at one end of the plate and housing. A plunger 86 within a cylinder 87 engaging the end of the latch plate is provided with a small explosive charge 88 within a chamber which is ignited to shift the latch plate to the released position for release of the cover 26. This shifting of the latch plate permits the wing assembly to extend outward forcing the cover to pivot outward about hinge pins 72 and release from its hinged position and be swept away by airflow along the missile body. The wing is then free to snap out to its fully deployed position.

While we have illustrated and described our invention by means of specific embodiments, it is to be understood that numerous changes and modifications may be made therein without departing from the spirit and scope of the invention as defined in the appended claims.

We claim:

1. In an airframe having a self-erecting wing structure, a wing housing structure comprising:

housing means defining a compartment for containing a self-erecting wing in a collapsed condition and an opening through which said self-erecting wing extends upon erecting;

a generally rectangular jettisonable cover releasably mounted over said opening and having a plurality of generally planar latch tabs along at least one side thereof;

releasable latching means for engaging said cover along the sides thereof for releasably securing said cover on said opening comprising movable latching means including a latch plate with latch fingers extending along the side of said compartment adjacent said opening for releasably engaging said latch tabs for retaining said cover in position over said opening.

2. The wing housing structure of claim 1 wherein: said compartment is elongated and extends generally along the axis of the airframe; and said latching means includes a fixed latching means extending along one side of said housing adjacent said opening.

3. The wing housing structure of claim 2 wherein:

said fixed latching means includes a plurality of hinge pins; and said moveable latching means comprises a slideable latching plate normally biased to a latched position.

4. The wing housing structure of claim 3 wherein:

said tabs on said cover includes a plurality of hinge tabs on one side of said cover for engaging said hinge pins; and a plurality of latch tabs on the other side of said cover for engaging said latch plate.

5. The wing housing structure of claim 4 wherein:

said latch plate includes a plurality of latch fingers for extending over said latch tabs on said cover in said latched position.

6. The wing housing structure of claim 5 including shifting means for shifting said latching plate to the unlatched position for releasing said cover.

7. The wing housing structure of claim 6 wherein:

said shifting means comprises a cylinder, a piston reciprocably mounted in said cylinder and operatively connected to said latch plate; and means for generating a gas pressure in said cylinder for forcing said piston outward and shifting said latch plate to the unlatched position.

8. The wing housing structure of claim 7 wherein:

said housing means includes a detachable base plate; and a collapsible wing mounted on said base plate and collapsible to a position completely within said housing means.

9. The wing housing structure of claim 8 wherein:

said wing includes a plurality of telescoping struts mounted on said base plate;

a fabric covering covering said struts and shaped to the configuration of the erected wing.

10. The wing housing structure of claim 9 wherein:

said wing covering is anchored to said housing by means of said base plate.

11. In an airframe having an self-erecting wing structure, a wing housing structure comprising:

housing means defining a generally elongated boxlike compartment having generally parallel side walls extending generally along the axis at the airframe for containing a self-erecting wing in a collapsed condition and defining an opening through which said self-erecting wing extends upon erecting;

a generally rectangular jettisonable cover releasably mouned over said opening and having a plurality of generally planar latch tabs along one side thereof and a plurality of hinge tabs along the other side thereof; and a plurality of hinge pins along one of said side walls for engagement by said hinge tabs for releasably securing said cover on said opening comprising;

movable latching means including a shiftable latch plate extending along the other of said side walls of said housing means adjacent said opening and including latch fingers for releasably engaging said latch tabs for retaining said cover in position over said opening; and piston means operatively connected to one end of said latch plate and responsive on pressurized gas for shifting said latch plate.

* * * * *